May 20, 1969     E. G. VALLIERE ET AL     3,445,766
ELECTRICAL PROBE DEVICE HAVING A PLURALITY OF
ADJUSTABLE CONTACTING ELEMENTS FOR TESTING
TRANSISTORS AND THE LIKE
Original Filed May 15, 1962
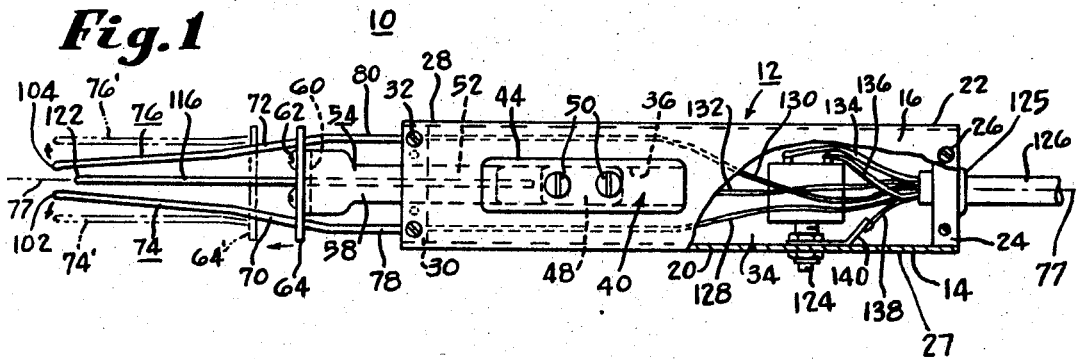
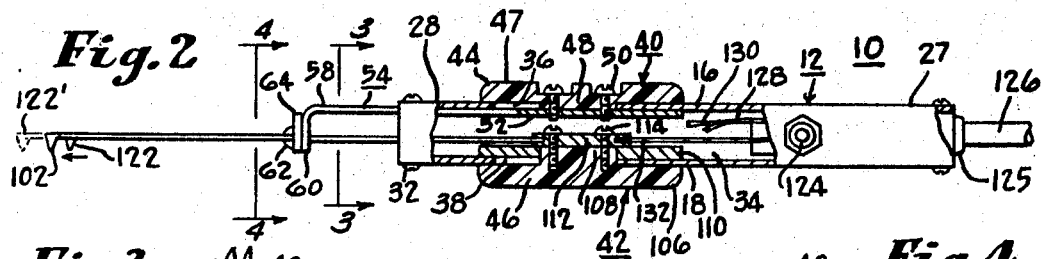
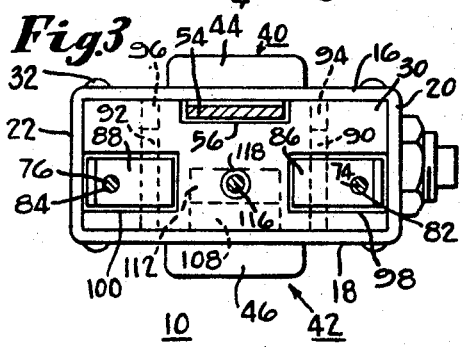
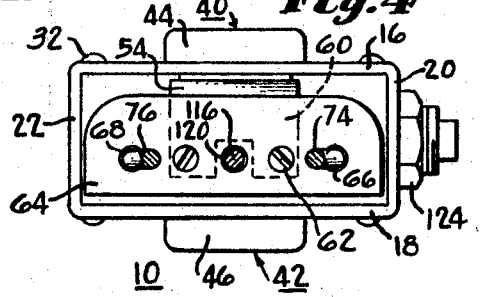
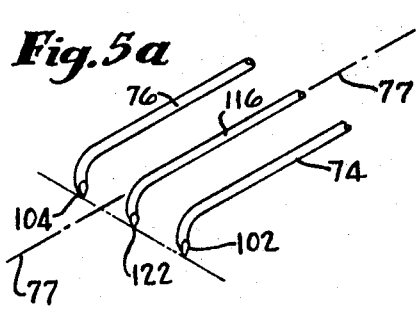
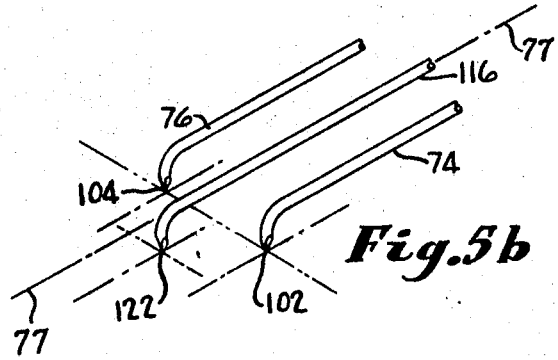
INVENTORS
EDWARD G. VALLIERE
JOHN M. OSTRANDER
BY Jacob Trachtman
ATTORNEY United States Patent Office 3,445,766
Patented May 20, 1969

3,445,766
ELECTRICAL PROBE DEVICE HAVING A PLURALITY OF ADJUSTABLE CONTACTING ELEMENTS FOR TESTING TRANSISTORS AND THE LIKE
Edward G. Valliere, 2421 Brookdale Ave., Roslyn, Pa. 19001, and John M. Ostrander, 508 Drayton Road, Oreland, Pa. 19075
Continuation of application Ser. No. 194,874, May 15, 1962. This application May 16, 1966, Ser. No. 550,563
Int. Cl. G01r 31/02; H01r 13/52
U.S. Cl. 324—72.5    25 Claims

ABSTRACT OF THE DISCLOSURE

A test probe for transistors and the like including a hand held housing and three substantially parallel probe elements extending therefrom for contacting the device under test. A first control means comprising a manually controlled slidable collar adjusts the lateral distance between the contacting ends of two of the probe elements, and a second control means adjustably extends the contacting end of the third probe element relative to the first two probe elements.

---

This is a continuation of application Ser. No. 194,874, filed May 15, 1962, and now abandoned.

The invention relates to a probe device, and more particularly, to a test probe device for providing electrical connection with an element such as a transistor having a plurality of terminals.

Heretofore, probe devices have been provided having fixed contacts for making contact with and testing various devices. However, such probing devices have not been provided with readily adjustable elements for making concurrent connections at required locations for in-circuit elements.

It is, therefore the principal object of the invention to provide a new and improved device having a plurality of elements which are readily adjustable for making contact at several locations.

Another object of the invention is to provide a new and improved probe device having adjustable elements for making concurrent contact at a plurality of linearly or non-linearly arranged locations.

Another object of the invention is to provide a new and improved probe device provided with contact elements which may be moved closer together or further apart to adjust the distance between them.

Another object of the invention is to provide a new and improved probe device particularly adapted for contacting the three terminals of a transistor device, and having the contacting elements of the device readily adjustable to conform with the spacing of the transistor terminals being contacted.

Another object of the invention is to provide a new and improved probe device which may readily be handled and adjusted by an operator using the fingers of one hand.

Another object of the invention is to provide a new and improved probe device which is readily and inexpensively manufactured and has a long operating life.

The above objects, as well as many other objects of the invention, are achieved by providing a probe device comprising a handle means having a longitudinal axis and opposite first and second side portions lying along the direction of the longitudinal axis. First, second and third wire elements are supported by the handle means and extend in the direction of the longitudinal axis and each have a distal contact end directed perpendicular to the longitudinal extending direction of its element.

A first control means includes an actuating member which is slidably supported by the first side portion of the handle means for movement in the direction of the longitudinal axis. A guide bar is attached to and movable with the actuating member and has an insulating plate at its distal end provided with first and second openings for respectively receiving therethrough the first and second wire element.

The first and second elements have a pivoted end joined with the handle means on opposite sides of the longitudinal axis and each have intermediate portions symmetrically inclined to the axis and engaging the insulating plate of the guide bar of the first control means at its first and second openings for angularly positioning the first and second elements about their respective pivotal connections with the handle means for reducing or increasing the distance between the contact ends of the first and second elements by the positioning of the actuating member of the first control means.

A second control means comprises an actauting member slidably supported by the second side portion of the handle means for movement in the direction of the longitudinal axis and is secured with the proximate end of the third element for adjusting the position of the contact end of the third element by positioning the actuating member of the second control means. The insulating plate of the guide bar of the first control means is also provided with a third opening between the first and second openings for receiving therethrough the intermediate portion of the third element and positioning the third element along the longitudinal axis of the handle means and between the first and second elements. The insulating plate of the guide bar allows the free movement of the third element in the axial direction through the third opening in the insulating plate. The second control means by movement of its actuating member positions the contact end of the third element along the axial direction for being in alignment with the contact ends of the first and second elements or displaced from such alignment in the direction toward or away from the handle means.

A cable including first, second and third conducting wires respectively electrically connected with the first, second and third wire elements may be provided for connecting same to appropriate apparatus, and a manual switch means for initiating a testing operation upon positioning and connection of the wire elements is carried by the handle means and located at the end of the handle means remote from the elements for ready operation by an operator.

The foregoing and other objects of the invention will become more apparent as the following detailed description of the invention is read in conjunction with the drawings, in which:

FIGURE 1 is a plan view of a probe device embodying the invention with a portion broken away, FIGURE 2 is a side elevation view of the device shown in FIGURE 1 with a portion shown in section, FIGURE 3 is an enlarged sectional view taken on line 3—3 of FIGURE 2, FIGURE 4 is an enlarged sectional view taken on line 4—4 of FIGURE 2, and FIGURES 5a and 5b are enlarged perspective views of the contacting elements of the device shown in FIGURE 1 illustrating respectively aligned and nonaligned arrangements of their contact ends.

Like reference numerals designate like parts throughout the several views.

Refer to the figures which disclose a probe device 10 embodying the invention. The device 10 has a handle means 12 comprising a substantially rectangular hollow tubular element 14 which may be made of a metallic material and has top and bottom walls 16, 18 and side walls 20, 22.

The rear end of the handle means 12 is enclosed by a back end block which may be secured by screws 26 with the rear end 27 of the handle means 20.

The forward end 28 of the handle means 12 is also enclosed by a front block 30 which may similarly be secured with the handle means 12 by screws 32, forming a cavity 34 within the handle means 12.

The top and bottom walls 16, 18 of the tubular means 14 are provided with rectangular elongated openings 36, 38, extending in a longitudinal direction of the handle means 12. First and second control means 40, 42 are provided with actuating plates 44, 46 which may be made of an electrically insulating material.

The actuating plate 44 has an enlarged top portion 47 which is received over the top surface 16 of the handle means 12 extending about the opening 36, and a reduced center portion 48 extending into the opening 36 of the handle means 12 allowing the movement of the plate 44 in the longitudinal direction along the opening 36 between extended and retracted terminal positions of the control means 40.

The actuating plate 44 of the first control means 40 is secured by the screws 50 with the end 52 of a metallic guide bar 54 for retaining the actuating member 44 in position over the top surface 16 of the handle means 12 and transmitting a longitudinal motion to the guide bar 54 with the movement of the actuating plate 44 of the first control means 40. The guide bar 54 is slidably received through a slot opening 56 along the top of the front block 30 of the handle means 12. The slot serves to also position and support the extending end 58 of the guide bar 54 in a direction parallel to the longitudinal axis of the handle means 12. The remote end 60 of the guide bar 54 is turned perpendicular to its extending direction and is secured by means of screws 62 with an electrical insulating plate 64.

The insulating plate 64 is provided with spaced openings 66, 68 (FIGURE 4) for slidably receiving therethrough the intermediate portions 70, 72 of a pair of electrically conducting probe wires 74, 76 (see FIGURE 1). The ends 78, 80 of the elements 74, 76 are pivotally attached to the forward end 28 of the handle means 12 by being securely received through openings 82, 84 of respective pivot blocks 86, 88 (FIGURE 3). The inner end portions of the pivotal blocks 86, 88 are horizontally pivoted about respective vertical pivot pins 90, 92 which are respectively received within vertical bore openings 94, 96 of the front block 30. For this purpose, the block 30 is also provided with rectangular openings 98, 100 for receiving the pivot blocks 86, 88 and allowing their pivotal action about their pins 90, 92.

The distal or extending ends 102, 104 of the wire elements 74, 76 each have an electrical contact point directed perpendicular to the extending direction of the elements for providing a desired electrical connection.

As seen most readily from FIGURE 1, the wire elements 74, 76 do not extend linearly in the horizontal plane, but provide a symmetrical form about the central longitudinal axis 77. The intermediate regions 70, 72 of the elements 74, 76 are purposely provided with an inclination in the horizontal plane towards the central longitudinal axis 77 for the purpose of adjusting the position of the contact ends 102, 104 of the elements 74, 76.

In order to move or adjust the position of the ends 102, 104 of the elements 74, 76 towards or away from each other, the first control means 40 is actuated. Thus with the ends 102, 104 of the elements 74, 76, shown in their terminal retracted position in FIGURE 1, the ends may be moved in a direction perpendicular to the longitudinal axis 77 away from each other by movement of the actuating plate 40 in the longitudinal direction to the left, or toward the wire elements 74, 76. This results in the movement of the guide bar 54 to the left with the insulating plate 64 shown in dashed lines at 64' in its displaced position to the left. In this position, the wire elements 74, 76 are caused to assume their position shown by the dashed lines at 74', 76' resulting from the outward pivotal movement of the elements 74, 76 about their pivoted ends 78, 80. This pivotal action is produced by the action of the insulating plate 64 which acts upon the intermediate portions 70, 72 of the elements 74, 76 in maintaining constant the distance between the elements 74, 76 where they pass through the openings 66, 68 in the insulating bar 64. Thus, for the arrangement shown, the distance between the contact ends 102, 104 of the wire elements 74, 76 is maximum with the actuating plate 44 of the first control means 40 moved to its extreme left terminal position, while the ends 102, 104 are most closely positioned to each other when the actuating bar 44 is placed in its other extreme position towards the end 27 of the handle means 12. The positioning of the actuating bar 44 to an intermediate position between its terminal positions acts to accordingly position the ends 102, 104 to corresponding intermediate distances as required, in the use of the probe means 10.

The actuating plate 46 of the second control means 42 is also provided with an enlarged outer portion 106 which overlies the bottom surface 18 of the tubular means 14 of the handle means 12 about the opening 38 and has a reduced inner portion 108 which is received through the slot opening 38, allowing the longitudinal motion of the actuating member 46 along the slot 38. The end 108 also receives about it a retaining washer 110 which is received within the cavity 34 of the handle means 12 about the opening 38 for retaining the member 46 in position with the aid of a locking plate 112 which is secured by screws 114 with the central portion 108 of the actuating plate 46 and overlies a portion of the retaining washer 110.

A third probe wire element 116 which is made of electrically conducting metallic material is joined with the locking plate 112 which is also composed of a metallic conducting material to provide a structural as well as an electrical connection therebetween. The wire element 116 extends through an enlarged opening 118 in the front block 30, so that the wire element 116 does not engage or make electrical contact with the block 30. The wire element 116 extends in the longitudinal direction along axis 77 away from the handle means 12 and passes through an opening 120 (FIGURE 4) in the insulating plate 64 centered between and in alignment with the openings 66, 68 which respectively receive therethrough the elements 74, 76. The insulating plate bar 64 also serves to prevent contact of the elements 116, 74, 76, with each other or with the guide bar 54.

The insulating plate 64 and guide bar 54 thus support the wire element 116 in horizontal alignment with the wire elements 74, 76 which are respectively positioned on either side of the element 116 within a horizontal plane. The distal end 122 of the center wire element 116 is also provided with a downwardly extending contact point (FIGURE 2) for electrical engagement at a desired location.

In operating the second control means 42, the actuating plate 46 may be moved in the longitudinal direction to extend or retract the end 122 of the element 116 along the longitudinal axis 77 away from or towards the handle means 12. The center wire element 116 is shown in its fully retracted terminal position in FIGURE 1, with the actuating plate 46 placed in its extreme right terminal position (see FIGURE 2). With the movement of the actuating plate 46 to the left or towards the front block 30, the contact end 122 is moved along the longitudinal or axial direction away from the handle means 12. With the actuating bar 46 in its extreme left position, the end 122 is placed in its extended terminal position shown by the dashed lines at 122'. The positions intermediate the extreme extended retracted positions of the wire element 116 are achieved by placing the actuating plate 46 in the appropriate intermediate position between its terminal locations.

FIGURE 5–a shows the wire elements 74, 76, 116 with their respective contact ends 102, 104 and 122 arranged along a line perpendicular to the longitudinal extending direction of the elements. In this aligned position, the outer elements 74 and 76 may be further positioned by causing them to be moved closer together or further apart between their extreme transverse terminal positions.

FIGURE 5–b shows the elements 74, 76, 116 with their contact ends 102, 104 and 122 in a nonaligned position forming a triangle with the contact 122 of the element 116 positioned beyond the ends 102, 104 of the elements 74, 76 along the longitudinal axis 77. The elements 74, 76 may again also be moved in the direction transverse to the longitudinal axis 77 so that the distance between them is adjustable between their transverse terminal positions.

It is also noted that in FIGURES 1 and 2, the elements 74, 76 and 116 are shown with their contact ends 102, 104 and 122 forming a triangular configuration with the end 122 of the wire element 116 positioned closer to the handle means 12 than the ends 102, 104 of the wire elements 74, 76. The dashed lines of FIGURE 1 also disclose the transverse adjustment of the outer wire elements 74, 76 for setting the distance between their contact ends 102, 104.

In operation of the probe device 10, when electrical contact is to be made with three points in a plane having a triangular or in line disposition, the operator grasps the handle means 12 of the device 10 with one hand and may then move the actuating plate 44 of the first control means 40 with the thumb of the hand for appropriately spacing the contacts 102, 104 of the outer wire elements 74, 76. The operator may now adjust the setting of the lower actuating plate 46 with his forefinger for properly positioning the contact end 122 of the central electrode 116. In this manner, contact with three points which may be the three terminals of a transistor connected in a circuit, may be concurrently made by the operator by appropriately orienting the handle 12 of the device 10. When thus positioned, proper electrical contact is made by the respective elements 74, 76 and 116. For the case where an operation is to be manually initiated upon the making of such contact, a switch 124 of the pushbutton type may be provided for actuation by the little finger of the operator. In this manner, the probe device 10 may, by the unique positioning of its control means, be operated by the use only of one hand and with a minimum effort by the operator.

A back block 24 of the handle means 12 may be provided with a cable clamp 125 for receiving therethrough and securing therewith a cable 126. The cable 126 may provide electrical conducting wires 128, 130 which are respectively connected with the ends 78, 80 of the wire elements 74, 76 extending into the cavity 34 of the handle means 12 through the openings 82, 84 of the pivot blocks 86, 88. The conducting wire 132 of the cable 126 is connected with the locking plate 112 for making electrical contact with the wire element 116. Thus the cable 126 with lines 128, 130 and 132 respectively electrically connected with the wire elements 74, 76, 116, may be connected with appropriate apparatus for utilizing the probe means 10. The wires 134, 136 of the cable 126 are connected through the switch 124 for initiating a test operation or any other such operation performed by the apparatus associated with the probe device 10. The wire 138 of cable 126 may be joined to the lug 140 for making electrical contact with or grounding to the tubular element 14 of the handle means 12 for connection with the shielding of the cable 126 as well known by the art.

What is claimed is:

1. An electrical probe means comprising a handle means extending along a longitudinal axis, first, second and third longitudinally extending conducting elements carried by said handle means and each having a contact end, and control means carried by said handle means engaging at least one of said elements for adjustably positioning and fixing the lateral distance and spacing of the contact end of said element with respect to at least one other of said elements, said control means also engaging at least one but not all of said elements for longitudinally extending the end of such element with respect to said handle means between first and second longitudinal terminal positions for adjustably positioning and spacing the end of such element independently with respect to the end of at least one of the remaining elements at any selected position between said first and second longitudinal terminal positions.

2. The means of claim 1 in which the contact end of each of said conducting elements is provided with a point directed perpendicular to the extending direction of its said element for making electrical contact with a respective lead of a transistor or external circuit.

3. The means of claim 1 in which said conducting elements are wire elements each extending outwardly from and supported by said handle means in adjustable fixed respective positions for having the contact end of each element make electrical contact with a respective lead of a transistor or external circuit.

4. The means of claim 1 providing a portable connecting device for testing transistors and the like with said handle means being unitary for being held and supported by one hand of an operator and said control means being positioned on said handle means for being operated by said hand of said operator while said hand is holding said handle means for adjustably fixing the relative positions with respect to each other of the contact ends of two or more of said elements for electrically engaging the contacts of an external circuit.

5. The means of claim 1 in which at least one of said elements is hingedly joined with said handle means for having the lateral distance and spacing of its contact end adjustably positioned and fixed with respect to the contact end of at least one other of said elements by said control means.

6. The means of claim 5 in which the contact ends of each of said elements extend perpendicularly from the extending longitudinal direction of said elements and each contact end has a point lying in a plane parallel to said longitudinal axis.

7. The means of claim 1 in which said handle means has first and second opposite side portions lying in the direction of said longitudinal axis, and said control means has first and second parts respectively supported by said first and second opposite side portions of said handle means.

8. The means of claim 7 in which said first control part is positioned on said handle means for adjustably positioning and fixing the lateral distance and spacing of the contact end of at least one of said elements with respect to at least one other of said elements, and said second control part is positioned on said handle means for longitudinally extending the end of at least one but not all of said elements with respect to said handle means.

9. The means of claim 8 providing a portable connecting device for testing transistors and the like with said handle means being unitary for being held and supported by one hand of an operator and the first and second parts of said control means being exposedly positioned thereon for being individually operated by respective contact with said hand of said operator while said hand is holding said handle means for adjustably fixing the relative positions of said elements for electrically engaging the contacts of an external circuit.

10. The means of claim 9 in which said conducting elements are wire elements each provided with a point directed perpendicular to the extending direction of its said element for making electrical contact with a respective lead of the transistor or external circuit being tested.

11. An electrical probe means comprising a handle means extending along a longitudinal axis, first, second and third longitudinally extending conducting elements mounted in said handle means and each having a contact end, and control means supported by said handle means engaging at least one of said first and second elements for adjustably positioning and fixing the lateral distance and spacing between the ends of said first and second elements at any selected position between first and second lateral terminal positions, and engaging said third element for longitudinally extending the end of said third element with respect to said handle between first and second longitudinal terminal positions for adjustably positioning and spacing its end independently with respect to the ends of said first and second elements at any selected position between said first and second longitudinal terminal positions.

12. The means of claim 11 in which the contact end of each of said conducting elements is provided with a point directed perpendicular to the extending direction of its said element for making electrical contact with a transistor or external circuit being tested.

13. The means of claim 11 in which said conducting elements are wire elements each extending outwardly from and supported by said handle means in adjustable fixed respective positions for having the contact end of each element make electrical contact with a respective lead of a transistor or external circuit.

14. The means of claim 11 providing a portable connecting device for testing transistors and the like with said handle means being unitary for being held and supported by one of an operator and said control means being positioned on said handle means for being operated by said hand of said operator while said hand is holding said handle means for adjustably fixing the relative positions with respect to each other of the contact ends of two or more of said elements for electrically engaging the contacts of an external circuit.

15. The means of claim 11 in which said first element is hingedly joined with said handle means for having the lateral distance and spacing of its contact end adjustably positioned and fixed with respect to the contact end of said second element by said control means.

16. The means of claim 15 in which both said first and second elements are respectively hingedly joined with said handle means for having the lateral distance and spacing of their contact ends adjustably positioned and fixed with respect to each other by said control means.

17. The means of claim 15 in which said control means engages said third element for longitudinally extending the end thereof with respect to said handle means and adjustably positioning and spacing the end of said third element with respect to the end of said first element.

18. The means of claim 17 in which said control means engages said third element for longitudinally extending the end thereof with respect to said handle means and adjustably positioning and spacing the end of said third element with respect to the ends of said first and second elements.

19. The means of claim 18 in which said first and second elements are positioned on opposite sides of said longitudinal axis and said third element is positioned along said longitudinal axis between said first and second elements.

20. The means of claim 11 in which said handle means has first and second opposite side portions lying in the direction of said longitudinal axis, and said control means has first and second parts respectively supported by said first and second opposite side portions of said handle means.

21. The means of claim 20 in which said first control part is positioned on said handle means for adjustably positioning and fixing the lateral distance and spacing between the ends of said first and second elements, and said second control part is positioned on said handle means for longitudinally extending the end of said third element with respect to the ends of said first and second elements.

22. The means of claim 21 providing a portable connecting device for testing transistors and the like with said handle means being unitary for being held and supported by one hand of an operator and the first and second parts of said control means being exposedly positioned thereon for being individually operated by respective contact with said hand of said operator while said hand is holding said handle means for adjustably fixing the relative positions of said elements for electrically engaging the contacts of an external circuit.

23. A portable probe device comprising a unitary handle means for being held and supported by one hand of an operator and having a longitudinal axis and opposite first and second side portions lying in the direction of said longitudinal axis; first, second and third wire elements supported by said handle means in adjustably fixed respective positions and in electrical insulation from each other and extending in the direction of said longitudinal axis and each having a distal contact end directed perpendicular to the longitudinal extending direction of its said element; a first control means including an actuating member slidably supported by the first side portion of said handle means and positioned thereon for being actuated by said hand of said operator while it is holding said handle means for movement in the direction of said longitudinal axis, a guide bar attached to and movable with said actuating member and having an insulating plate at its distal end provided with first and second openings for respectively receiving therethrough an inclined portion of said first and second wire elements for adjusting and fixing the position with respect to each other of the contact ends of said first and second elements by positioning said actuating member, and a second control means comprising an actuating member slidably supported by the second side portion of said handle means and positioned thereon for being actuated by said hand of said operator while it is holding said handle means for movement in the direction of said longitudinal axis and being secured with the proximate end of said third element for adjusting the position of the contact end of said third element by positioning said actuating member of said second control means.

24. The probe device of claim 23 in which said first and second elements have pivotal connections with said handle means on opposite sides of said longitudinal axis and said third element is positioned along said axis between said first and second elements; said first and second elements each have an intermediate portion symmetrically inclined to said axis and engaging the insulating plate of the guide bar of said first control means through its first and second openings for angularly positioning said first and second elements about their respective pivotal connections with said handle means for reducing or increasing the distance between the contact ends of said first and second elements by positioning the actuating member of said first control means; and the insulating plate of the guide bar of said first control means being provided with a third opening between said first and second openings for receiving therethrough the intermediate portion of said third element and positioning said third element along said longitudinal axis of said handle means and between said first and second elements while allowing movement of said third element in said axial direction; and said second control means providing for positioning of said third element in the axial direction by the movement of the actuating member of said second control means for positioning the contact end of said third element along said axial direction for being in alignment with the contact ends of said first and second elements or displaced from such alignment in the direction towards or away from said handle means.

25. The device of claim 24 including means for electrically connecting said first, second and third wire elements with respective electrical conducting means, and manual switch means for initiating a testing operation upon positioning and connection of said elements, carried by said handle means at its end remote from said elements.

References Cited

UNITED STATES PATENTS

| 3,079,475 | 2/1963 | Rumble. | |
| 2,476,365 | 7/1949 | Greco | 339—74 |
| 2,711,523 | 6/1955 | Willis. | |
| 2,775,744 | 12/1956 | Heuneman | 339—74 |
| 2,894,205 | 7/1959 | Schrock | 324—72.5 |
| 3,013,242 | 12/1961 | Terlinde | 339—74 X |
| 3,134,942 | 5/1964 | Rhodes | 324—158 X |
| 3,185,927 | 5/1965 | Margulis | 324—158 |

RUDOLPH V. ROLINEC, Primary Examiner.

E. L. STOLARUN, Assistant Examiner.

U.S. Cl. X.R.

339—74, 108